United States Patent [19]

Baile et al.

[11] Patent Number: 4,492,415
[45] Date of Patent: Jan. 8, 1985

[54] UNITARY FULL COMPLEMENT BEARING COMPONENTS CONTAINING ROLLING ELEMENTS IN A SELF-SUPPORTING LUBRICATING MATRIX

[75] Inventors: George H. Baile, Beach Haven, N.J.; John J. Johnson, Wayne, Pa.

[73] Assignee: SKF Industries, Inc., King of Prussia, Pa.

[21] Appl. No.: 354,501

[22] Filed: Mar. 3, 1982

[51] Int. Cl.³ .................. F16C 33/38; F16C 33/44; F16C 33/56; C10M 5/00

[52] U.S. Cl. .................................... 384/463; 252/12; 384/523

[58] Field of Search .................. 308/217, 207 R, 187, 308/DIG. 8, DIG. 9, 243, 201; 252/12

[56] References Cited

U.S. PATENT DOCUMENTS

| | | | |
|---|---|---|---|
| 1,907,015 | 5/1933 | Swart | 308/217 X |
| 2,038,474 | 4/1936 | Brown | 308/216 X |
| 3,135,564 | 6/1964 | Agens | 308/187 |
| 3,729,415 | 4/1973 | Davis et al. | 252/12 X |
| 4,146,487 | 3/1979 | Rumierz | 252/12 |
| 4,239,632 | 12/1980 | Baile | 252/12 |
| 4,280,571 | 7/1981 | Fuller | 384/93 X |

FOREIGN PATENT DOCUMENTS 156522  12/1981  Japan ........................... 308/236

*Primary Examiner*—Stuart S. Levy
*Assistant Examiner*—Thomas Hannon
*Attorney, Agent, or Firm*—Eugene E. Renz, Jr.

[57] ABSTRACT

Novel, unitary, full complement bearing components are described which comprise a plurality of rolling elements embedded in a solid, self-supporting lubricating matrix with at least one arcuate operative surface of each rolling element exposed for rolling contact with another bearing component, the rolling elememts being in side-by-side contact or only slightly spaced from each other, and the matrix being composed of a gel obtained by thermally curing a mixture of lubricating oil and a high molecular weight polymer, and being capable of exuding lubricating oil under sliding friction in operation after insertion of the bearing component into a bearing structure in a single assembly operation. Full complement as used herein means a cageless rolling element bearing with a maximum number of rolling elements wherein no additional rolling elements can be added to the complement of rolling elements and wherein the rolling elements are in side-by-side relation.

24 Claims, 16 Drawing Figures

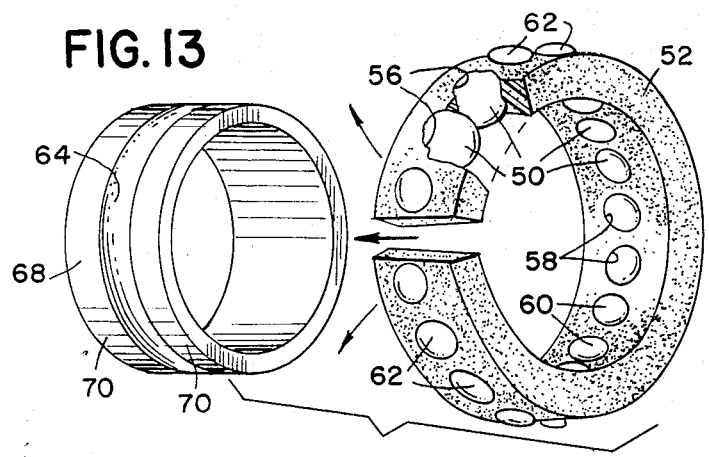
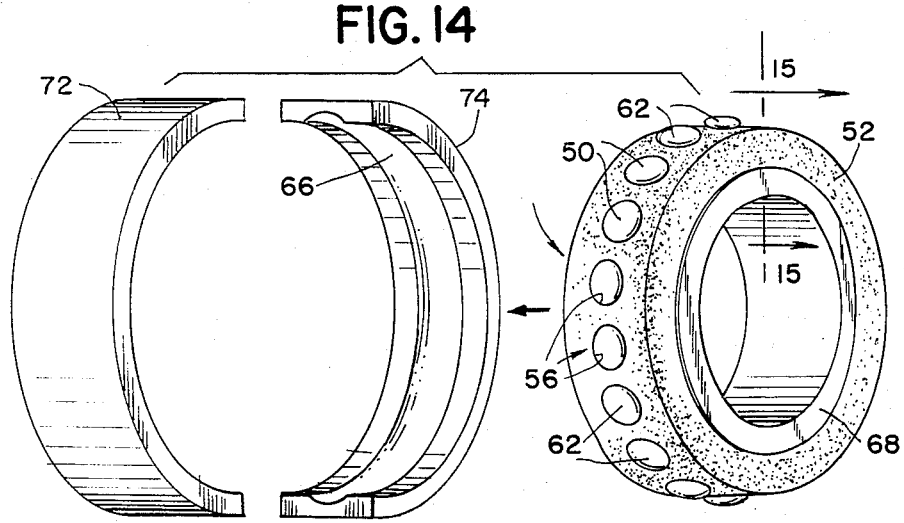
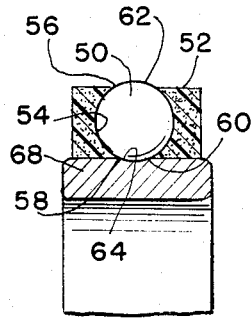
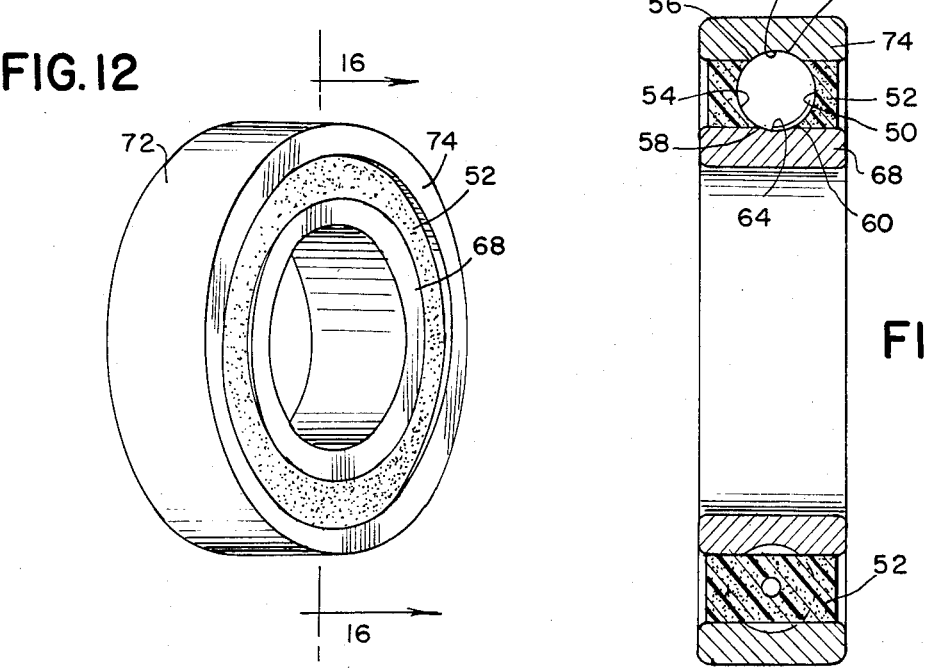
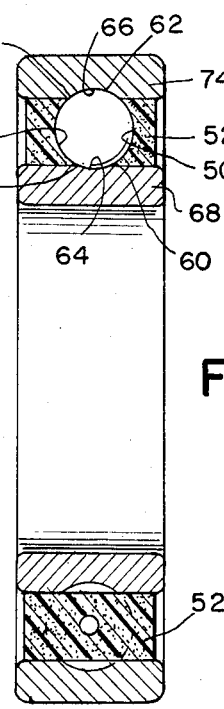

UNITARY FULL COMPLEMENT BEARING COMPONENTS CONTAINING ROLLING ELEMENTS IN A SELF-SUPPORTING LUBRICATING MATRIX

BACKGROUND OF THE INVENTION

It has long been recognized that it would be desirable in many industries and arts to provide a lubricating product or article which would be capable of releasing lubricant over a prolonged period of time under a wide variety of operating conditions, and particularly under heavy load or high temperature conditions. For example, self-lubricating bearings are of great value in the automotive, rock drilling and other industries. It has also been recognized that it would be highly desirable for such lubricants to be selfsupporting, i.e. to have sufficient inherent mechanical strength to actually constitute or at least form a part of the lubricating structure. Therefore, it has been apparent that shaped lubricating articles, composed of a relatively rigid, self-supporting composition, and capable of prolonged use under adverse conditions and heavy loads would be highly desirable.

While various suggestions been made along these lines in the prior art, heretofore the lubricant was introduced to the bearing assembly either after the bearing was assembled and the rolling elements placed in operative position with subsequent gelling of the lubricant, or a shaped lubricant gel was formed outside the bearing, but only in such a manner that it could be loosely inserted or packed around the rolling elements in the assembled bearing.

THE PRIOR ART

Self-supporting lubricating compositions and articles and methods for producing them have been described in the prior art. For example, Davis, et al U.S. Pat. Nos. 3,729,415, issued Apr. 23, 1973; 3,547,819, issued Dec. 15, 1970; and 3,541,011, issued Nov. 17, 1970; all disclose lubricating compositions comprising a hydrocarbon oil and polyethylene in various forms, including self-supporting gels which exude oil and thus have an oily lubricating surface. British Pat. No. 1,173,123, published Sept. 4, 1960, is based on the foregoing Davis, et al U.S. Pats. but suggests that polypropylene and polybutylene may be used in such compositions, although all of the working examples actually employ only polyethylene.

Agens U.S. Pat. No. 3,135,564, issued June 2, 1964, disclosed an anti-friction bearing and a method of making it which contains a formed-in-place, unitary, solid, plastisol containing a lubricant completely filling an annulr space to provide lubrication.

Scott and Swartz U.S. Pat. No. 3,913,922, issued Oct. 21, 1975, discloses a method and apparatus employing a mass of grease placed on a dispensing surface on a rotating member in such a way that the centrifugal force of the grease against the dispensing surface causes oil to be released from the grease under use conditions.

It will be seen from the foregoing that self-supporting lubricating compositions and articles such as bearings containing them have been developed previously. However, the existing compositions of this type have been found to be useful only at operating temperatures no higher than about 105° C. (221° F.) since they become tacky, lose their lubricity and are discharged leaving a dry bearing at temperatures of 110° C. (230° F.) or higher.

While the self-supporting, semi-rigid gel lubricating structures provided by the foregoing prior art have proven successful commercially, it has been found that for such compositions containing a high molecular weight polymer of any given average molecular weight, the conditions under which rolling bearings may be operated with such lubricants are limited to certain maximum temperature and loads. When such temperatures and loads are exceeded, the lubricants fail and are expelled from the bearing. It has been recognized, therefore, that it would be desirable to improve such lubricants and articles by increasing the temperature and loads under which they remain operable.

Rumierz U.S. Pat. No. 4,146,487 issued Mar. 27, 1979, describes improved lubricating gels comprising lubricating oil and polymethylpentene as the high molecular weight polymer.

A still further improvement in such lubricating compositions and shaped articles has been described in Baile U.S. Pat. No. 4,239,632, issued Dec. 16, 1980, wherein the compositions and articles consist essentially of the Rumierz gels also containing a heat conductive agent to conduct heat away from the bearing to prolong the life of the gel and the bearing.

Gel lubricants for use in the rock drilling industry are disclosed in Fuller U.S. Pat. No. 4,280,571, issued July 28, 1981. The lubrication and seal system disclosed is for a rock bit that includes a bit body arranged to be connected to a drilling string or the like and having an axle portion thereon. A cutting member is journaled on the axle portion and provides a cavity between the axle portion and cutting member in which there are disposed bearings for rotatably supporting the loads on the cutting member on the axle portion. A pressurized fluid passageway extends through the bit body to the cavity for transmitting bearing conditioning fluid to the bearings. A permeable material having a lubricant in the pores in the material is disposed in the available space between bearings in the cavity in contact with the load carrying bearing and in the fluid passageway whereby the lubricant in the pores is gradually deposited on the bearing to provide a generally continuous lubrication thereof. The permeable material is a gel that is formed as a lubricant mixed with polymers and heated to a predetermined temperature and which, under bit operating conditions is generally expelled from said bit, thereby opening the passage and cavity to pressurized bearing conditioning fluid.

It is apparent from the foregoing that the gelled lubricant compositions and shaped articles formed therefrom are becoming increasingly important in the bearing field in a wide variety of applications for which fluid and grease lubricants are inoperative.

However, it has been apparent for some time that further improvements are needed in this field, especially to permit very high load although low speed operations, and operation in adverse chemical environments, and to facilitate and simplify assembly of full complement bearings.

It is, therefore, an object of the present invention to provide an improved, unitary, full complement bearing component comprising a lubricating matrix retaining a plurality of rolling elements, which can be inserted into a bearing in a single operation and thereby facilitate the task of assembling bearings.

It is also another object of the invention to provide a unitary "bearing bracelet" comprised of a full complement of rolling elements encased in a lubricating matrix of a configuration which surrounds and enbraces the major portion of the rolling elements for good lubrication and only exposes small segments of each rolling element which contact other surfaces of a bearing assembly such as the raceways.

It is a particular object of the invention to provide such a unitary, full complement bearing component which comprises a plurality of rolling elements in a solid lubricating matrix which holds the rolling elements in operative position in the bearing.

It is another object of the invention to provide improved bearing components capable of withstanding very high loads, and adverse environmental conditions without loss of lubricant from the bearing.

BRIEF SUMMARY OF THE INVENTION

The foregoing and other objects of the invention, which will become apparent below, are attained by providing a component of a full complement bearing assembly containing a plurality of rolling elements in a self-supporting lubricating matrix with at least one arcuate operative surface of each rolling element exposed for rolling contact with another bearing element. The matrix of the bearing component is composed of a solid, tough, elastic gel comprising a lubricating oil and a high molecular weight polymer; the gel being capable of exuding lubricating oil on response to sliding friction. The lubricating gel may be made in any manner known to the art or hereafter developed, it being only necessary that it have sufficient mechanical strength and integrity for the intended application, and the ability to supply lubricant to the bearing surfaces during operation. The presently preferred lubricating gels are derived from lubricating oil and high molecular weight polyethylene or polymethylpentene.

DETAILED DESCRIPTION OF THE INVENTION

The invention will now be described in greater detail in conjunction with the accompanying drawings showing preferred embodiments thereof and in which:

FIG. 12 is a perspective view of another embodiment of bearing assembly incorporating the novel bearing element of the present invention;

FIG. 13 is a perspective view illustrating the bearing element prior to assembly to the inner ring;

Figure 1:
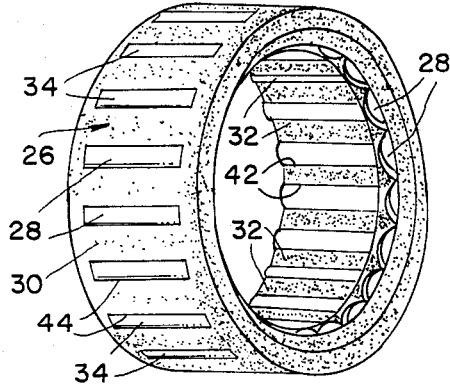
FIG. 1 is a perspective view of a unitary polymer lubricant encapsulated rolling element bracelet of the invention.
Figure 5:
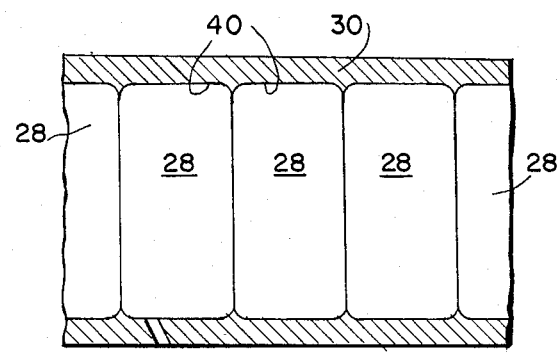
FIG. 5 is an enlarged fragmentary sectional plane view taken on the line 5—5 of FIG. 2.
Figure 2:
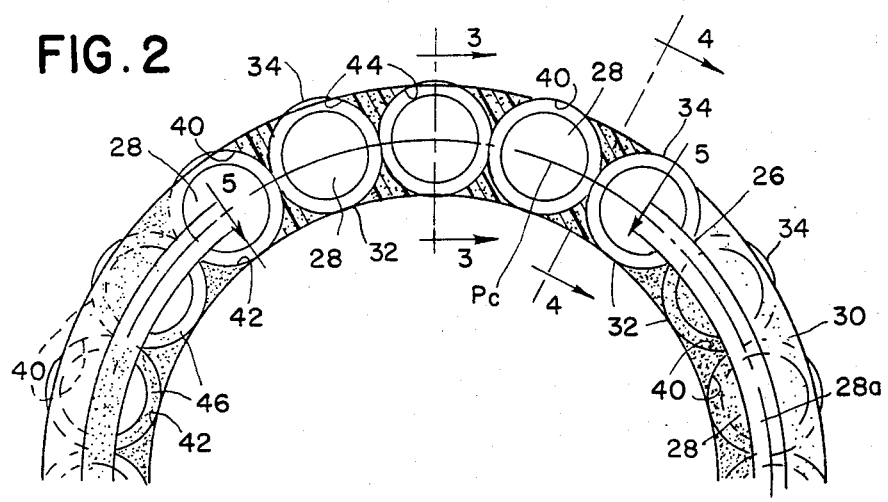
FIG. 2 is an enlarged fragmentary side elevational view of the bracelet shown in FIG. 1, with a portion broken away to show additional details of the bracelet.
Figure 3:
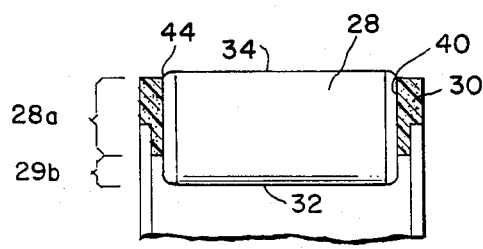
FIG. 3 is an enlarged fragmentary transverse sectional view taken on the line 3—3 of FIG. 2.
Figure 4:
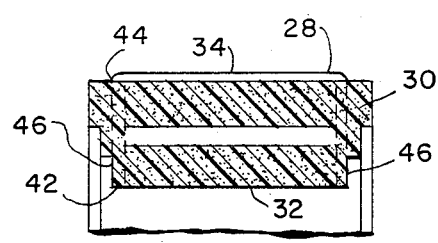
FIG. 4 is an enlarged fragmentary transverse sectional view taken on the line 4—4 of FIG. 2.

FIG. 14 is a perspective view showing the bearing element and inner ring prior to assembly to the split outer ring; and FIGS. 15 and 16 are sectional views taken on lines 15—15 of FIG. 14 and lines 16—16 of FIG. 12.

DESCRIPTION OF THE PREFERRED EMBODIMENTS

Referring now to the drawings and particularly to FIGS. 1-10 thereof, there is illustrated an embodiment of full complement bearing assembly in accordance with the present invention which is generally designated by the numeral 10.

The bearing assembly illustrated is a single row cylindrical and includes inner ring 12 having radially outwardly directed flanges 14 at opposite axial ends defining an inner raceway 16 therebetween and an outer ring 18 having a pair of axially spaced grooves 20 for clips 22 defining an outer raceway 24 therebetween.

In accordance with the present invention, a unitary full complement bearing component 26 is provided comprising a plurality of rolling elements, in the present instance, cylindrical rollers 28 which are encased in a lubricating matrix 30 made of a material described hereafter which may be cast or extruded to the donut-shaped configuration shown to form a so-called "bearing bracelet" of the present invention. The full complement of rolling elements 28 as illustrated are supported in the lubricating matrix 30 in close side by side relation and the lubricating matrix 30 is conformed in a predetermined manner to expose inner and outer arcuate portions 32 and 34 of each of the rolling elements which engage the inner and outer raceways in the assembled bearing. Additionally, in the present instance the lubricating matrix 30 overlies and encloses a portion of the outer axial end faces of each of the rolling elements from approximately the pitch circle $C_p$ thereof radially outwardly as at $28^a$ and exposes a portion of the axial end faces of each of the rolling elements of each of the cylindrical rollers from the pitch circle $C_p$ radially inwardly as at $29^b$. The lubricating matrix as cast or extruded with the rolling elements, therefore has a plurality of circumferential closely spaced pockets 40 for each of the rolling elements 28 and each pocket has small rectangular shaped inner and outer openings 42 and 44 to expose inner and outer arcuate portions of the rolling elements to engage the inner and outer raceways of the bearing rings of the complete bearing assembly. Each pocket has generally half moon-shaped openings 46 at opposite axial ends to expose the axial end faces of the rolling elements from the pitch circle $C_p$ radially inwardly. By this arrangement, when the bearing bracelet is assembled in the inner and outer rings, the exposed longitudinal contact areas 32 and 34 of each of the rolling elements directly engages the raceways 16 and 24 respectively and the axial ends of the rolling elements directly confront the confronting side flanges 14 of the inner ring in the manner shown in FIG. 10.

The bearing bracelet of the present invention is easy to assemble in the entire bearing assembly. For example, in the single row bearing illustrated, the matrix 30 is simply severed at one location and is flexible enough to permit the bearing bracelet to be expanded slightly radially to engage over the flange 14 of the inner ring and the natural resiliency of the matrix returns it to a circular configuration when the bracelet has passed over the flange to permit easy assembly into the outer ring 18. Thereafter, the side clips are simply engaged in the grooves 20 adjacent axial ends of the outer ring to complete the bearing assembly.

In operation of the bearing, the rollers 28 are free to rotate in the lubricating matrix 30 to draw lubricant therefrom and conduct it to the contact zone of the rollers and raceways as well as to the region where the rollers 28 confront and engage the flanges 14 of the inner ring 12.

Figure 11:
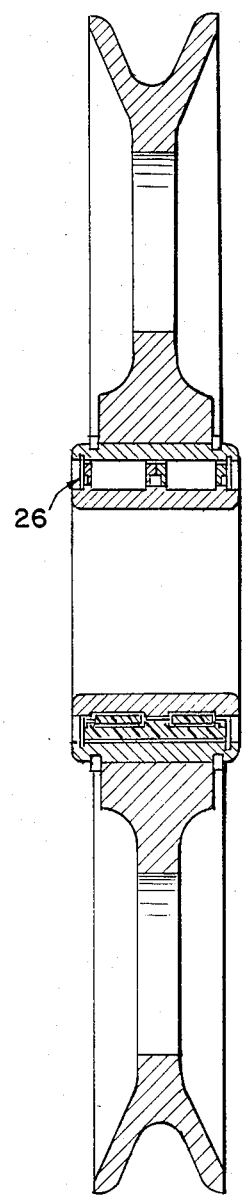
FIG. 11 is a sectional view through a rope pulley showing a modified double row polymer lubricant encapsulated rolling element bracelet as described in FIGS. 1-10 in one particular mode of use, the pulleys being used primarily on cranes where high loads and moderate speeds are encountered.
Figure 6:
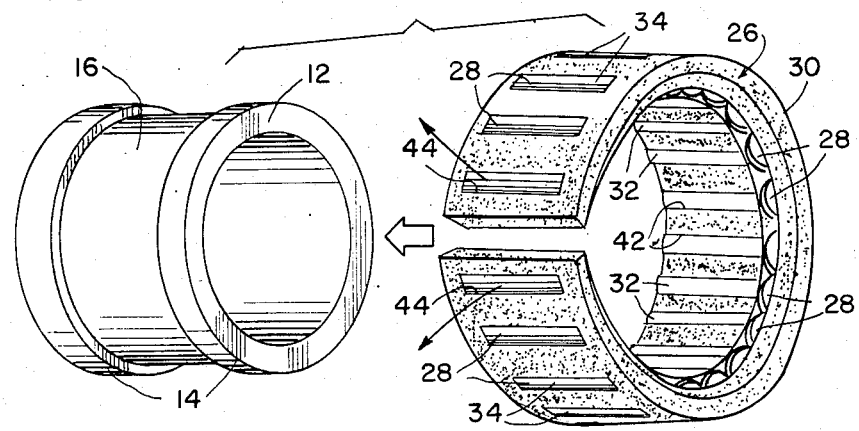
FIG. 6 is a perspectie view illustrating the assembly procedure of radially severing the polymer lubricant encapsulated rolling element bracelet shown in FIG. 1 prior to encircling the flanged inner ring of a bearing assembly.
Figure 7:
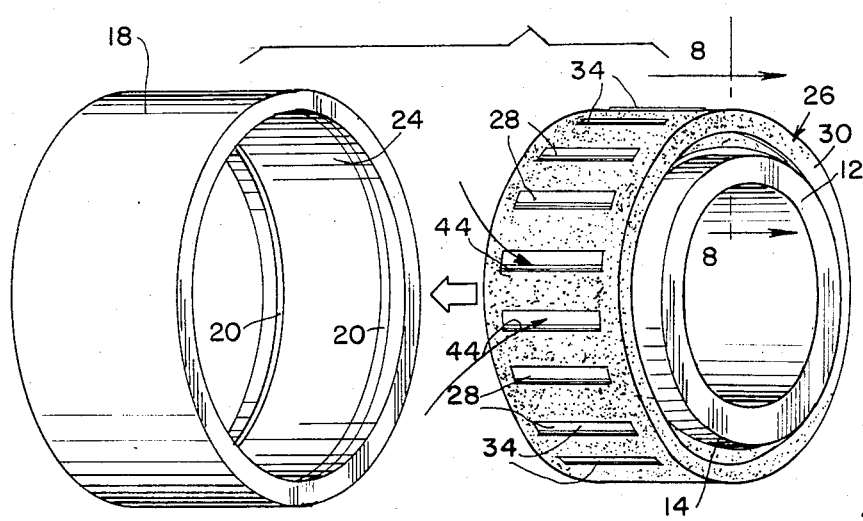
FIG. 7 is a perspective view illustating the bracelet secured about the inner ring of a bearing assembly, the slit closed and the bracelet and the inner ring about to be inserted into the outer ring.
Figure 8:
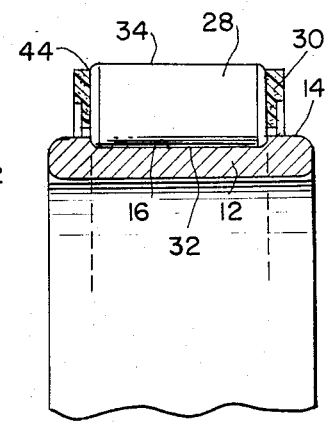
FIG. 8 is an enlarged sectional view taken on the line 8—8 of FIG. 7 showing details of the bracelet positioned on the inner ring of the bearing assembly.
Figure 9:
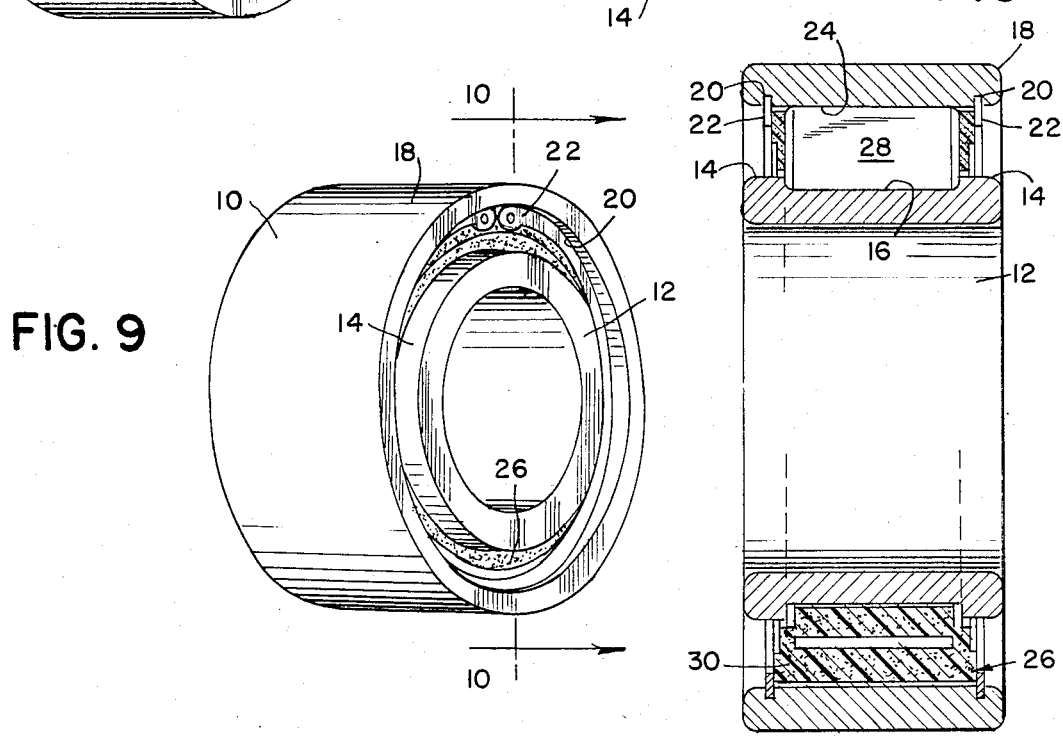
FIG. 9 is a perspective view of the completed bearing assembly.
Figure 10:
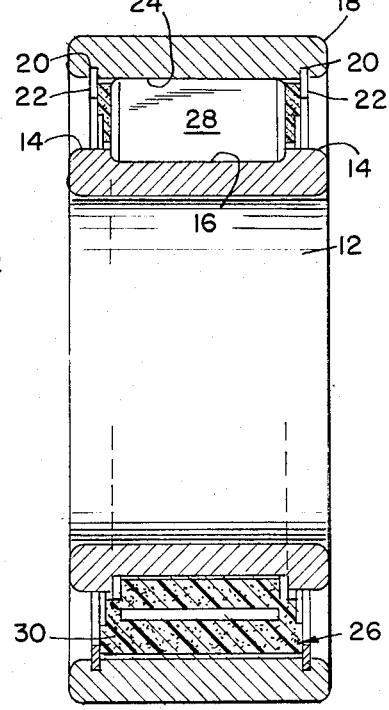
FIG. 10 is an enlarged transverse sectional view taken on the line 10—10 of FIG. 9 showing details of the completed bearing.

Even though the bearing bracelet has been illustrated and described in connection with a single row cylindrical bearing assembly, it is to be understood that the principle applies to multi-row bearing, for example, as illustrated in FIG. 11. The bearing bracelet also has application in assemblies where the side flanges are on the outer ring and in this instance the slit matrix is simply compressed to a size so it fits through the opening defined by an end flange of an outer ring and the resiliency of the matrix once it is aligned with the raceway returns it to facilitate assembly of a flangeless inner ring. The component may be slit on a bias to facilitate assembly.

The full complement cageless bearing bracelet of the present invention as noted above is particularly adapted for use in applications involving high load and low rotational speeds. For example, as illustrated in FIG. 11, the bearing according to the present invention which is illustrated as a double row cylindrical bearing assembly. In this assembly the inner ring is simply supported on a shaft for the pulley which is mounted on the outer ring.

Even though the above embodiment is illustrated in the environment of a cylindrical bearing assembly, the invention has application to other types of roller assemblies such as tapers and sphericals.

There is illustrated in FIGS. 12–16 inclusive another embodiment of full complement cageless bearing assembly in accordance with the present invention. The bearing is a single row deep groove ball type and in accordance with this embodiment, a full complement of balls 50 is cast or extruded in a lubricating matrix 52. In the present instance the matrix thus formed has a series of circumferentially closely spaced pockets 54 for the balls defined therein by the extrusion process. Each of the pockets 54 as illustrated is open radially outwardly and inwardly as at 56 and 58 to expose semi-spherical inner and outer portions 60 and 62 of each of the balls. These exposed surfaces of the balls ride in the inner and outer grooved raceways 64 and 66 as illustrated in FIGS. 15 and 16.

The full complement bearing bracelet may be assembled rather easily to the inner ring 68 simply by slitting it at one location and expanding it so that it engages readily over the land surface 70 on one side of the inner raceway groove 64 and when it is fully seated in place, the halves 72 and 74 of the outer ring are simply positioned over the assembly and may be conncted at the juncture to form the integral assembly. In some instances, the outer ring halves are simply supported in place in a fitted opening in a bearing housing or the like. It is, of course, to be understood that the outer ring may be sectionalized in halves extending through the center of the raceway if desired. As in the previously described embodiment, the outer ring may be integral and the bearing bracelet simply compressed to fit it in place and the inner ring sectionalized. As noted previously, in this instance the slit is preferably on a bias. The principle of the bearing bracelet also has applications to other types of ball bearings, for example, angular contact and ball thrust bearings.

THE LUBRICATING MATRIX

As noted above, the lubricating matrix can be produced by any means known to the art so long as it has sufficient mechanical strength and the ability to release sufficient lubricant for the intended application. However, the presently preferred lubricating matrices are the self-supporting lubricating gels disclosed in prior U.S. Patents of Davis, et al U.S. Pat. Nos. 3,729,415, issued Apr. 23, 1973; 3,547,819 issued Dec. 15, 1970 and 3,541,011, issued Nov. 17, 1970; all of which disclose lubricating compositions comprising a hydrocarbon oil and polyethylene in various forms. The disclosures of these three Davis et al patents are hereby incorporated herein by reference in their entirety.

Especially preferred lubricating gels are described in Rumierz U.S. Pat. No. 4,146,487, issued Mar. 27, 1979. These compositions are similar to those of Davis et al except that the high molecular weight polymer employed is polymethylpentene (PMP) which is used in a proportion of about 50 to about 10% by weight to about 50 to about 90% by weight of lubricating oil. The entire disclosure of this patent is also incorporated herein by reference.

The especially preferred lubricating gels of Rumierz U.S. Pat. No. 4,146,487 may be improved even further by the invention of Baile U.S. Pat. No. 4,239,632 which involves the addition of about 20 to about 50% by weight of a heat conductive agent capable of conducting heat away from a bearing surface where it is generated thus tending to prolong the life of the lubricant gel and bearing. The entire disclosure of this patent is also incorporated herein by reference.

THE METHOD OF MAKING THE NEW BEARING COMPONENTS

A full complement of rolling elements are placed in a mold designed to retain them in operative position and yet provide surrounding void space for receipt of the material which forms the matrix. A homogeneous mixture is comprised of lubricating oil and a suitable high polymer, each of a type and in proportions such that the mixture is capable of thermal curing to produce a solid, self-supporting, tough, semi-rigid but elastic gel capable of exuding lubricating oil in response to sliding friction. This mixture produced by conventional blending techniques, is introduced to the mold which is then heated to the curing temperature of the particular mixture for sufficient time, usually about an hour, to bring about the desired cure. The mold is then allowed to cool to produce a bearing element consisting of a solid gel matrix containing the rolling elements in operative relation.

This mixture can also be introduced to the mold by hot injection molding.

The preparation of typical gels useful in the invention will be illustrated in the following specific examples.

EXAMPLE 1

The method of Davis et al U.S. Pat. No. 3,547,819 can be employed to produce the unitary bearing components of the present invention. Suitably 120 grams of a hydrocarbon mineral oil such as Sunvis 941, available from Sun Oil Co., and 40 grams of polyethylene of molecular weight average 3.5 to 4.0 million available as Hostalen GUR 212 UHMW Polyethylene from American Hoechst Corporation, can be cold mixed using conventional mixing equipment until the polyethylene particles are well distributed through the oil. The resulting mixture will contain about 75% oil and 25% polyethylene, by weight. One method of manufacture is to place this mixture into a suitable mold containing a plurality of rolling elements side by side, the mold having a suitable volume and configuration to form a matrix around the rolling elements, but such as to leave at least one arcuate operative surface of each rolling element exposed. The mold should be placed in a preheated oven at 350° F. and maintained at that temperature for about an hour, after which it may be removed. After the oil-polyethylene mixture is allowed to cool, the molded article can be removed from the mold. This procedure produces a unitary, full complement bearing component of the invention comprising a solid, tough, semi-rigid but somewhat elastic matrix containing the plurality of rolling elements all held in operative position. The resulting gel also has the capability of exuding lubricating oil when subjected to sliding friction. Such a bearing component is adapted to be inserted in a bearing assembly in one operation to supply the bearing assembly with not only its full complement of rolling elements but a solid lubricant matrix which needs no retaining cage.

EXAMPLE 2

The method of Rumierz U.S. Patent can also be employed to make the bearing elements of the invention. For example, a mixture of about 70% lubricating oil and about 30% polymethylpentene (PMP), by weight, can be prepared by conventional mixing techniques. More specifically, the mixture may be made up from about 40 grams of PMP and 93 grams of lubricating oil which can be suitably mixed in a blender for one minute or until homogeneous. The PMP is suitably in the form of a 60–120 mesh powder which is commercially available as "TPX Polymer" from Mitsui Petrochemical Industries. This PMP has an average molecular weight of about 4 million. A suitable oil is a synthetic hydrocarbon oil available from Mobil Oil Corporation under the trade name "SHC624" which has a viscosity of 33 mm$^2$/s at 38° C. (100° F.).

The resulting mixture is then handcast or injection molded into a suitable mold containing a full complement of rolling elements. If hand cast, the mold is then heated to 218° C. (425° F.) and maintained at that temperature for about an hour. When allowed to cool, the resulting bearing component can be removed from the mold. Such a bearing component will consist of a solid, self-supporting, tough, semi-rigid but elastic matrix containing a plurality of embedded and partially encased rolling elements. The mold is designed to provide bearing elements each having one or more of its surfaces exposed in a plane or planes which will contact the bearing surfaces in the full complement bearing assembly.

Generally speaking, the preferred gels of this type consist essentially of about 50 to about 90% by weight of an oil of lubricating viscosity and about 50 to about 10% by weight of polymethylpentene having an average molecular weight in the range from about 3 to about 5 million; the oil being a mineral oil, an ester oil, a diester oil, or preferably a synthetic hydrocarbon oil, and having a viscosity in the range from about 15 to about 300 millimeters$^2$/second (mm$^2$/s) at 38° C. (100° F.); the shaped articles can be formed in situ in a mold by heat curing a physical mixture of the oil and polymethylpentene at a temperature somewhat above the initial softening point of the latter for about 45 to 75 minutes and allowing the mixture to cool to form a firm, tough, solid gel having an oily surface provided by oil exuding from the gel to thus produce a lubricating mass operable for extended periods of time at temperature up to about 160° C. (320° F.).

The physical characteristics of the gels used in the present invention vary somewhat depending upon the average molecular weight of the PMP or polyethylene (average molecular weight 1.5 to 5 million) and the proportion of the polymer in the final lubricating composition. Increasing the molecular weight and concentration of polymer in the composition increases the firmness, toughness and rigidity of the gel. These characteristics are correspondingly decreased by decreasing the molecular weight and concentration of the polymer in the composition. It will be seen, therefore, that by varying the molecular weight and concentration of the polymer, lubricating compositions can be produced which are especially adapted for use in any particular application.

As will be apparent to those skilled in the art, conventional lubricating additives such as nylon or teflon powder and molybdenum disulfide may also be incorporated in the matrix in known manner.

Even though the bearing bracelet is shown and described as a unitary component, it is to be understood that the component may be severed or split or initially formed in a plurality of segments for ease of assembly into the space for the rolling elements in some applications. Also the component may be extruded in strip form, cut to desired lengths and then shaped to conform to the space in the bearing such as the annular space between the rings. Further if desired, the entire axial end faces of the rollers may be exposed through the matrix so that a ribbon of the matrix surrounds the chamfered ends of the rollers adjacent the axial end faces thereof to maintain the matrix as a unitary element.

While particular embodiments of the present invention have been illustrated and described herein, it it not intended to limit the invention and changes and modifications may be made therein with the scope of the following claims:

What is claimed is:

1. A component of a full complement bearing assembly comprising:
   a. a plurality of rolling elements;
   b. a self-supporting lubricating matrix composed of a solid, tough, elastic gel comprising a lubricating oil and a high molecular weight polymer, and being capable of exuding lubricating oil in response to sliding friction;

c. means defining a plurality of pockets in said matrix of a configuration closely conforming to the rolling elements and each pocket having at least one opening to expose at least one operative surface of each rolling element permitting rolling contact with another bearing element;

d. said matrix acting to positively space said rolling elements in said assembly and hold them in place to permit or facilitate assembly of said rolling elements to said bearing as a unit and to maintain said rolling elements in properly spaced relation during operation of said bearing; and e. said rolling elements being in the form of a circular bracelet having an axial bore severed at least at one location to form a split ring capable of being temporarily deformed to permit its installation over the retaining flanges of the inner ring of a bearing assembly.

2. A bearing component of claim 1 wherein said matrix is obtained by thermally curing a composition containing a hydrocarbon-based lubricating oil and a polymer selected from the group consisting of polyethylene having an average molecular weight in the range from about 1.5 million up to about 5 million, and polymethylpentene having a molecular weight in the range from about 3 million up to about 5 million.

3. A bearing component of claim 1 wherein the rolling elements are cylindrical rollers.

4. A bearing component of claim 1 wherein the rolling elements are balls.

5. A bearing component of claim 1 wherein the rolling elements are arranged in more than one radial row.

6. A component of a full complement bearing assembly comprising:

a. a plurality of rolling elements;

b. a self-supporting, lubricating matrix composed of a solid, tough, elastic gel comprising a lubricating oil and a high molecular weight polymer, and being capable of exuding lubricating oil in response to sliding friction;

c. means defining a plurality of pockets in said matrix of a configuration closely conforming to the rolling elements and each pocket having at least one opening to expose at least one operative surface of each rolling elements permitting rolling contact with another bearing element;

d. said matrix acting to positively space said rolling elements in said assembly and hold them in place to permit or facilitate assembly of said rolling elements to said bearing as a unit and to maintain said rolling elements in properly spaced relation during operation of said bearing;

e. said rolling elements being in the form of a circular bracelet having an axial bore severed radially to form a split ring capable of being temporarily deformed to permit its installation over the retaining flanges of the inner ring of a bearing assembly; and f. said self-supporting lubricating matrix being derived by thermally curing a composition comprising from about 10 up to about 95% by weight of a hydrocarbon based oil of lubricating viscosity and from about 5 up to about 90% by weight of polyethylene having an average molecular weight in the range from about 1.5 million up to about 5 million, and wherein the cured composition is in the form of a solid, tough, elastic gel.

7. A bearing component of claim 6 wherein at least some of said arcuate operative surfaces of said rolling elements are in the same plane as at least one plane of said matrix.

8. A bearing component as claimed in claim 7 wherein at least some of said arcuate operative surfaces of said rolling elements project radially from a plane of said matrix.

9. A bearing component of claim 6 wherein at least some of said arcuate operative surfaces of said rolling elements project radially from a plane of said matrix.

10. A bearing component of claim 6 wherein the hydrocarbon based oil is of mineral, ester, diester, or synthetic origin.

11. A bearing component of claim 10 wherein the oil is a 130 cSt (600 SUS) mineral oil.

12. A bearing component of claims 10 or 11 wherein the matrix also comprises molybdenum disulfide, teflon, or other dry lubricant.

13. A bearing component of claim 10 wherein said matrix also comprises a heat conductive agent.

14. A component of a full complement bearing assembly comprising:

a. a plurality of rolling elements;

b. a self-supporting, lubricating matrix composed of a solid, tough, elastic gel comprising a lubricating oil and a high molecular weight polymer, and being capable of exuding lubricating oil in response to sliding friction;

c. means defining a plurality of pockets in said matrix of a configuration closely conforming to the rolling elements and each pocket having at least one opening to expose at least one operative surface of each rolling element permitting rolling contact with another bearing element;

d. said matrix acting to positively space said rolling elements in said assembly and hold them in place to permit or facilitate assembly of said rolling elements to said bearing as a unit and to maintain said rolling elements in properly spaced relation during operation of said bearing;

e. said rolling elements being in the form of a circular bracelet having an axial bore; and f. said self-supporting lubricating matrix being derived by thermally curing a composition comprising from about 50 up to about 90% by weight of a hydrocarbon based oil of lubricating viscosity and from about 50 to about 10% by weight of polymethylpentene having an average molecular weight in the range from about 3 to about 5 million and wherein the cured composition is in the form of a solid, tough, elastic gel.

15. A bearing component of claim 14 wherein the bracelet is severed to form a split ring capable of being temporarily deformed to permit its installation over the retaining flanges of the inner ring of a bearing assembly.

16. A bearing component of claim 15 wherein at least some of said arcuate operative surfaces of said rolling elements are in the same plane as at least one plane of said matrix.

17. A bearing component of claim 16 wherein at least some of said arcuate operative surfaces of said rolling elements project radially from a plane of said matrix.

18. A bearing component as claimed in claim 14 wherein at least some of said arcuate operative surfaces of said rolling elements project radially from a plane of said matrix.

19. A bearing component of claim 14 wherein the hydrocarbon based oil is of mineral, ester, diester or synthetic origin.

20. A bearing component of claim 19 wherein the oil is a 130 cSt (600 SUS) mineral oil.

21. A bearing component of claim 19 wherein the matrix also comprises a heat conductive agent.

22. A bearing component of claim 19 wherein the matrix also comprises molybdenum disulfide, teflon or other dry lubricant.

23. A component of a full complement bearing assembly comprising:
  a. a plurality of rollers;
  b. a self-supporting, lubricating matrix composed of a solid, tough, elastic gel comprising a lubricating oil and a high molecular weight polymer, and being capable of exuding lubricating oil in response to sliding friction;
  c. means defining a plurality of pockets in said matrix of a configuration closely conforming to the rollers and each pocket having at least one opening to expose at least one operative surface of each roller permitting rolling contact with another bearing element;
  d. said matrix acting to positively space said rollers in said assembly and hold them in place to permit or facilitate assembly of said rollers to said bearing as a unit and to maintain said rollers in properly spaced relation during operation of said bearing; and
  e. said matrix overlying and enclosing a portion of the outer axial end faces of said rollers from approximately the pitch circle thereof radially outwardly.

24. A component of a full complement bearing assembly comprising:
  a. a plurality of rollings elements;
  b. a self-supporting, lubricating matrix composed of a solid, tough, elastic gel comprising a lubricating oil and a high molecular weight polymer, and being capable of exuding lubricating oil in response to sliding friction;
  c. means defining a plurality of pockets in said matrix of a configuration closely conforming to the rolling elements and each pocket having at least one opening to expose at least one operative surface of each rolling element permitting rolling contact with another bearing element;
  d. said matrix acting to positively space said rolling elements in said assembly and hold them in place to permit or facilitate assembly of said rolling elements to said bearing as a unit and to maintain said rolling elements in properly spaced relation during operation of said bearing;
  e. said rolling elements being in the form of a circular bracelet having an axial bore; and
  f. said self-supporting lubricating matrix being derived by thermally curing a composition comprising from about 10 up to about 95% by weight of a hydrocarbon based oil of lubricating viscosity and from about 5 up to about 90% by weight of polyethylene having an average molecular weight in the range from about 1.5 million up to about 5 million, and wherein the cured composition is in the form of a solid, tough, elastic gel.

* * * * *